J. E. FINLEY.
Curry-Comb.
No. 202,161. Patented April 9, 1878.
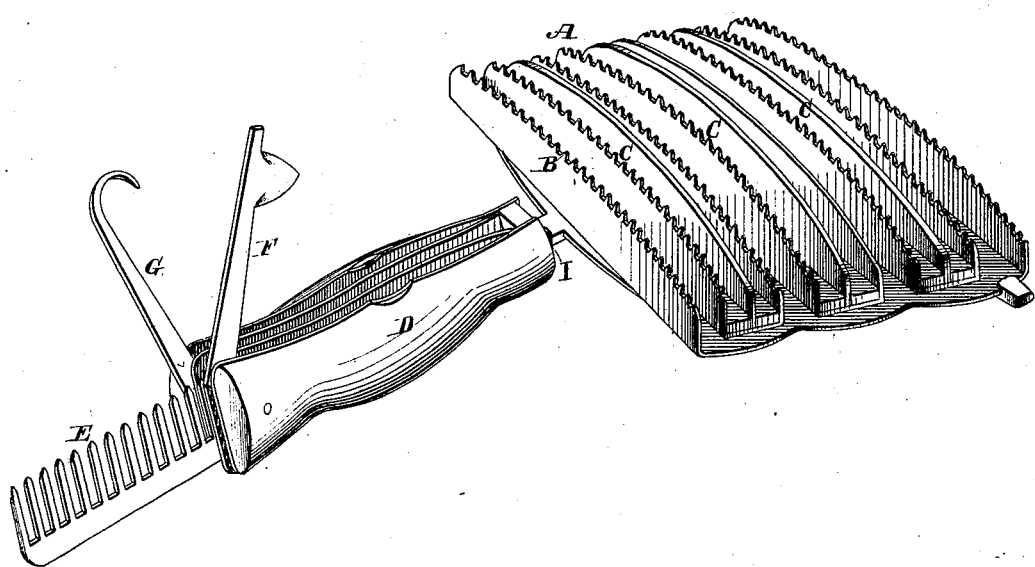
Attest.
J. S. Galloway
J. E. Frost
Inventor.
John E. Finley

UNITED STATES PATENT OFFICE.

JOHN E. FINLEY, OF MEMPHIS, TENNESSEE.

IMPROVEMENT IN CURRY-COMBS.

Specification forming part of Letters Patent No. 202,161, dated April 9, 1878; application filed January 8, 1878.

*To all whom it may concern:*

Be it known that I, JOHN E. FINLEY, of Memphis, Shelby county, Tennessee, have invented certain Improvements in Curry-Combs, of which the following is a specification:

My invention consists in certain improvements in a curry-comb, whereby the efficiency of it in ordinary use is greatly increased, and certain attachments are made to it which are of great value and convenience to any one having the care and handling of horses.

The primary use of a curry-comb is to loosen and clean the dirt or dandruff from the horse's hide, and clean and smooth the hair of the animal. With the ordinary curry-comb this is all that is effected; but by inserting a few bars of yielding material or india-rubber between the bars containing the teeth of the curry-comb, as shown in the drawing hereto annexed, the dandruff and dirt are largely removed, while the rubber bars take hold of all loose hair and dandruff and remove them from the hide of the animal. Acting as a curry-comb and brush combined, by this means much less work is required in currying and cleaning the horse's or animal's coat.

The drawing is a perspective view, in which A represents an ordinary curry-comb, with rows of teeth B of the usual kind. C C represent bars of india-rubber, standing between the rows of teeth and about the same height. D represents the handle of the same, constructed in a novel manner to contain the attachments named above, which consist in a coarse comb, E, lancet F, and hoof-cleaner G.

The utility of the comb for dressing the mane and tail of the animal, the lancet for bleeding the animal in case of sickness, and the hoof-cleaner for removing dirt or gravel from the hoof, render this combination of great convenience to those having the care of stock; and to secure this object to the fullest extent I attach the handle of the curry-comb in such a manner that it can readily be detached and used with perfect freedom separate from the curry-comb.

The means shown in the drawing consist of a screw, I, formed on the shank of the curry-comb, upon which the handle, constructed as a knife with three blades, can be removed or used at pleasure. To prevent unscrewing, the comb E is made to engage in a notch in the point of the screw I when closed. This arrangement adapts the instrument to many uses.

I claim as my improvement in grooming devices—

1. The rubber or other elastic or yielding plates or bars alternating with the metallic comb-bars.

2. The handle D, containing horse-grooming implements, detachably connected to the currying device.

JOHN E. FINLEY.

Witnesses:
J. S. GALLOWAY,
J. E. FROST.